US009892398B2

(12) United States Patent
Forster

(10) Patent No.: US 9,892,398 B2
(45) Date of Patent: Feb. 13, 2018

(54) DISTRIBUTED POINT OF SALE, ELECTRONIC ARTICLE SURVEILLANCE, AND PRODUCT INFORMATION SYSTEM, APPARATUS AND METHOD

(71) Applicant: Ian James Forster, Essex (GB)

(72) Inventor: Ian James Forster, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/100,833

(22) Filed: Dec. 9, 2013

(65) Prior Publication Data

US 2014/0100978 A1    Apr. 10, 2014

Related U.S. Application Data

(62) Division of application No. 13/287,269, filed on Nov. 2, 2011, now Pat. No. 8,630,908.

(51) Int. Cl.
*G06Q 20/00* (2012.01)
*G06Q 20/20* (2012.01)
*G06Q 20/32* (2012.01)

(52) U.S. Cl.
CPC .......... *G06Q 20/208* (2013.01); *G06Q 20/20* (2013.01); *G06Q 20/202* (2013.01); *G06Q 20/32* (2013.01); *G06Q 20/3278* (2013.01)

(58) Field of Classification Search
None
See application file for complete search history.

(56) References Cited

U.S. PATENT DOCUMENTS

| | | | |
|---|---|---|---|
| 1,331,136 | A | 2/1920 | Woodjard |
| 2,953,776 | A | 9/1960 | Blutman et al. |
| 3,607,573 | A | 9/1971 | Michaelides et al. |
| 3,932,124 | A | 1/1976 | Wasley et al. |

(Continued)

FOREIGN PATENT DOCUMENTS

| | | |
|---|---|---|
| BR | PI0611910 | 2/2011 |
| CN | 1219262 | 6/1999 |

(Continued)

OTHER PUBLICATIONS

Violino, Bob. A Summary of RFID Standards. RFID Journal. Jan. 16, 2005. URL at http://www.rfidjournal.com/articles/view?1335.*

(Continued)

*Primary Examiner* — Scott A Zare
(74) *Attorney, Agent, or Firm* — Avery Dennison Retail Information Services, LLC

(57) ABSTRACT

A distributed point of sale, electronic article surveillance, and product information system. The system can include a central database and at least one integrated POS/EAS/information terminal adapted to communicate with NFC-enabled devices, RFID and EAS tags, and the database, wherein, when a customer places an NFC-enabled device and a product having an RFID and EAS tag and proximate the terminal, the terminal facilitates a transaction for purchasing the product. The terminal can include a processor, an NFC transceiver, a UHF RFID reader, and a Bluetooth transceiver. The transaction for purchasing the product can be performed via the NFC-enabled device.

17 Claims, 4 Drawing Sheets

(56) References Cited

U.S. PATENT DOCUMENTS

| | | | |
|---|---|---|---|
| 4,060,975 A | 12/1977 | Yamaguchi |
| 4,410,901 A | 10/1983 | Szeliga et al. |
| 4,424,513 A | 1/1984 | Hatao et al. |
| 4,534,819 A | 8/1985 | Payet et al. |
| 4,577,665 A | 3/1986 | Diesner |
| 4,728,236 A | 3/1988 | Kraus |
| 5,056,837 A | 10/1991 | Fuehrer |
| 5,083,111 A | 1/1992 | Drucker et al. |
| 5,112,420 A | 5/1992 | Diesner |
| 5,364,678 A | 11/1994 | Lumb et al. |
| 5,460,342 A | 10/1995 | Dore et al. |
| 5,485,291 A | 1/1996 | Qiao |
| 5,523,146 A | 6/1996 | Bodford et al. |
| 5,598,994 A | 2/1997 | Olewinski et al. |
| 5,641,219 A | 6/1997 | Mizobe |
| 5,653,699 A | 8/1997 | Reed et al. |
| 5,658,647 A | 8/1997 | Magill et al. |
| 5,720,123 A | 2/1998 | Taylor |
| 5,803,413 A | 9/1998 | Benoit et al. |
| 5,867,017 A | 2/1999 | Merwin et al. |
| 5,921,674 A | 7/1999 | Koczi |
| 5,926,921 A | 7/1999 | Benoit |
| 5,944,405 A | 8/1999 | Takeuchi |
| 5,947,578 A | 9/1999 | Ayres |
| 6,099,944 A | 8/2000 | Laprade et al. |
| 6,103,364 A | 8/2000 | Harris et al. |
| 6,133,400 A | 10/2000 | Helmeke |
| 6,142,375 A | 11/2000 | Belka et al. |
| 6,144,264 A | 11/2000 | Wen |
| 6,228,486 B1 | 5/2001 | Kittel et al. |
| 6,246,778 B1 | 6/2001 | Moore |
| 6,493,440 B2 | 12/2002 | Gromatzky et al. |
| 6,495,229 B1 | 12/2002 | Carte |
| 6,511,927 B1 | 1/2003 | Ellis et al. |
| 6,645,887 B2 | 11/2003 | Kocinec et al. |
| 6,771,256 B1 | 8/2004 | Abraham et al. |
| 6,786,626 B2 | 9/2004 | Wu |
| 6,838,989 B1 | 1/2005 | Mays et al. |
| 6,839,035 B1 | 1/2005 | Addonisio et al. |
| 6,851,999 B2 | 2/2005 | Fong |
| 6,884,491 B2 | 4/2005 | Rubin et al. |
| 6,897,281 B2 | 5/2005 | Lubnin et al. |
| 6,940,408 B2 | 9/2005 | Ferguson et al. |
| 6,965,205 B2 | 11/2005 | Piepgras et al. |
| 7,012,544 B2 | 3/2006 | Cunningham et al. |
| 7,046,160 B2 | 5/2006 | Pederson et al. |
| 7,064,498 B2 | 6/2006 | Dowling et al. |
| 7,084,769 B2 | 8/2006 | Bauer et al. |
| 7,086,587 B2 | 8/2006 | Myllymaki |
| 7,086,769 B1 | 8/2006 | Thompson et al. |
| 7,094,733 B2 | 8/2006 | Laney et al. |
| 7,098,794 B2 | 8/2006 | Lindsay |
| 7,109,986 B2 | 9/2006 | Kerr et al. |
| 7,158,037 B2 | 1/2007 | Forster et al. |
| 7,167,106 B2 | 1/2007 | Hasse |
| 7,202,838 B2 | 4/2007 | Kerr et al. |
| 7,224,278 B2 | 5/2007 | Phaneuf et al. |
| 7,237,713 B2 | 7/2007 | White |
| 7,292,148 B2 | 11/2007 | Forster |
| 7,304,577 B2 | 12/2007 | Waldner |
| 7,364,983 B2 | 4/2008 | Wang et al. |
| 7,375,650 B2 | 5/2008 | Lo |
| 7,377,421 B2 | 5/2008 | Rhoads |
| 7,378,973 B2 | 5/2008 | Dixon |
| 7,477,152 B2 | 1/2009 | Forster |
| 7,490,054 B2 | 2/2009 | Reade et al. |
| 7,492,346 B2 | 2/2009 | Manabe |
| 7,495,576 B2 | 2/2009 | Maskeny et al. |
| 7,515,149 B2 | 4/2009 | Kerr et al. |
| 7,564,426 B2 | 7/2009 | Poor |
| 7,600,906 B2 | 10/2009 | Chon |
| 7,604,856 B2 | 10/2009 | Kronzer et al. |
| 7,654,723 B2 | 2/2010 | Chang |
| 7,670,020 B2 | 3/2010 | Chang |
| 7,683,856 B2 | 3/2010 | Sakai et al. |
| 7,695,165 B2 | 4/2010 | Chang |
| 7,722,172 B2 | 5/2010 | Silverbrook |
| 7,722,241 B2 | 5/2010 | Chang |
| 7,750,810 B2 | 7/2010 | Ritter et al. |
| 7,752,790 B1 | 7/2010 | Michael et al. |
| 7,756,467 B2 | 7/2010 | Bent et al. |
| 7,810,983 B2 | 10/2010 | Chang |
| 7,817,045 B2 | 10/2010 | Onderko |
| 7,845,823 B2 | 12/2010 | Mueller |
| 7,850,341 B2 | 12/2010 | Mrakovich |
| 7,868,778 B2 | 1/2011 | Kenwright |
| 7,876,101 B2 | 1/2011 | Lee |
| 7,903,103 B2 | 3/2011 | Osterberg et al. |
| 7,920,050 B2 | 4/2011 | Juels |
| 7,959,326 B2 | 6/2011 | Laporte |
| 7,961,097 B2 | 6/2011 | Porte et al. |
| 7,979,026 B2 | 7/2011 | Hulvey |
| 8,014,722 B2 | 9/2011 | Abel et al. |
| 8,018,345 B2 | 9/2011 | Xiang |
| 8,102,797 B2 | 1/2012 | Abel |
| 8,112,066 B2 | 2/2012 | Ayed |
| 8,117,445 B2 | 2/2012 | Werner et al. |
| 8,126,505 B2 | 2/2012 | Tulloch |
| 8,228,264 B2 | 7/2012 | Ng et al. |
| 8,249,935 B1* | 8/2012 | DiMartino et al. ............. 705/16 |
| 8,321,922 B1 | 11/2012 | Lo et al. |
| 8,332,272 B2* | 12/2012 | Fisher ............. 705/16 |
| 8,469,269 B2* | 6/2013 | Daily et al. ............. 235/383 |
| 8,474,700 B1 | 7/2013 | Lewis et al. |
| 8,655,286 B2 | 2/2014 | Mendolia |
| 8,937,531 B2 | 1/2015 | Rimai et al. |
| 2001/0051265 A1 | 12/2001 | Williams et al. |
| 2002/0030992 A1 | 3/2002 | Lefebvre |
| 2002/0036622 A1 | 3/2002 | Jaeger et al. |
| 2002/0081420 A1 | 6/2002 | Kronzer et al. |
| 2002/0154633 A1 | 10/2002 | Shin |
| 2002/0158817 A1 | 10/2002 | Matsuo |
| 2002/0159246 A1 | 10/2002 | Murasko et al. |
| 2002/0186133 A1 | 12/2002 | Loof |
| 2003/0029918 A1 | 2/2003 | Leanheart et al. |
| 2003/0034985 A1 | 2/2003 | Needham Riddle |
| 2003/0035933 A1 | 2/2003 | Stahl |
| 2003/0113548 A1 | 6/2003 | Corzani et al. |
| 2003/0115096 A1 | 6/2003 | Reynolds |
| 2003/0220036 A1 | 11/2003 | Lee |
| 2004/0012486 A1 | 1/2004 | Mani |
| 2004/0122161 A1 | 6/2004 | Paul et al. |
| 2004/0146729 A1 | 7/2004 | Ahmed et al. |
| 2004/0220860 A1 | 11/2004 | Persky et al. |
| 2004/0244902 A1 | 12/2004 | Bleckmann |
| 2005/0017071 A1* | 1/2005 | Noonan ............. 235/385 |
| 2005/0100689 A1 | 5/2005 | He et al. |
| 2005/0131103 A1 | 6/2005 | Hassan et al. |
| 2005/0206524 A1 | 9/2005 | Forster et al. |
| 2005/0280631 A1 | 12/2005 | Wong et al. |
| 2005/0282495 A1 | 12/2005 | Forster |
| 2006/0028822 A1 | 2/2006 | Tanamachi |
| 2006/0070681 A1 | 4/2006 | Haroutoonian et al. |
| 2006/0080819 A1 | 4/2006 | Mcallister |
| 2006/0089073 A1 | 4/2006 | Sobieski |
| 2006/0090384 A1 | 5/2006 | Woodruff |
| 2006/0135013 A1 | 6/2006 | Higashiguchi et al. |
| 2006/0135668 A1 | 6/2006 | Hayes |
| 2006/0160488 A1 | 7/2006 | Sueoka et al. |
| 2006/0182898 A1 | 8/2006 | Ben-Shalom et al. |
| 2006/0214794 A1 | 9/2006 | Wang |
| 2006/0215958 A1 | 9/2006 | Yeo |
| 2006/0252182 A1 | 11/2006 | Wang et al. |
| 2006/0261938 A1 | 11/2006 | Lai |
| 2006/0264006 A1 | 11/2006 | Kian et al. |
| 2006/0266824 A1 | 11/2006 | Hassenbueger |
| 2006/0273176 A1 | 12/2006 | Audebert et al. |
| 2006/0290501 A1 | 12/2006 | Hammad et al. |
| 2006/0293956 A1 | 12/2006 | Walker et al. |
| 2007/0008140 A1 | 1/2007 | Saarisalo et al. |
| 2007/0013479 A1 | 1/2007 | Goel et al. |
| 2007/0029939 A1 | 2/2007 | Burkum et al. |
| 2007/0056871 A1 | 3/2007 | Griffiths |
| 2007/0075145 A1 | 4/2007 | Arendonk et al. |

(56) References Cited

U.S. PATENT DOCUMENTS

| | | |
|---|---|---|
| 2007/0090954 A1 | 4/2007 | Mahaffey |
| 2007/0120772 A1 | 5/2007 | Kim et al. |
| 2007/0145152 A1 | 6/2007 | Jogand-Coulomb et al. |
| 2007/0188483 A1 | 8/2007 | Bonner |
| 2007/0194879 A1 | 8/2007 | Backes et al. |
| 2007/0215685 A1 | 9/2007 | Self et al. |
| 2007/0229250 A1 | 10/2007 | Recker et al. |
| 2007/0235125 A1 | 10/2007 | Doeling |
| 2007/0273951 A1 | 11/2007 | Ribi |
| 2007/0274242 A1 | 11/2007 | Lamacraft et al. |
| 2008/0022160 A1 | 1/2008 | Chakraborty |
| 2008/0040845 A1 | 2/2008 | Shoshan |
| 2008/0064346 A1 | 3/2008 | Charrat |
| 2008/0079582 A1 | 4/2008 | Alexis et al. |
| 2008/0094854 A1 | 4/2008 | Coleman |
| 2008/0101400 A1 | 5/2008 | Auterinen |
| 2008/0117047 A1 | 5/2008 | Collins et al. |
| 2008/0117056 A1 | 5/2008 | Forster |
| 2008/0132167 A1 | 6/2008 | Bent et al. |
| 2008/0150719 A1* | 6/2008 | Cote et al. ............... 340/572.1 |
| 2008/0183581 A1 | 7/2008 | Coppolani et al. |
| 2008/0191878 A1 | 8/2008 | Abraham |
| 2008/0192932 A1 | 8/2008 | Graeber et al. |
| 2008/0198098 A1 | 8/2008 | Gelbman et al. |
| 2008/0219227 A1 | 9/2008 | Michaelis |
| 2008/0238610 A1 | 10/2008 | Rosenberg |
| 2008/0238706 A1 | 10/2008 | Kenwright |
| 2008/0248815 A1 | 10/2008 | Busch |
| 2008/0251582 A1 | 10/2008 | Nguyen |
| 2008/0255960 A1 | 10/2008 | Nguyen |
| 2008/0262928 A1 | 10/2008 | Michaelis |
| 2008/0276507 A1 | 11/2008 | Hines |
| 2008/0300985 A1 | 12/2008 | Shamp et al. |
| 2008/0309836 A1 | 12/2008 | Sakama et al. |
| 2009/0081943 A1 | 3/2009 | Dobyns et al. |
| 2009/0085746 A1 | 4/2009 | Erickson et al. |
| 2009/0088229 A1 | 4/2009 | Hammad et al. |
| 2009/0102748 A1 | 4/2009 | Stoyer et al. |
| 2009/0115614 A1 | 5/2009 | Bertin |
| 2009/0146814 A1 | 6/2009 | Hammad et al. |
| 2009/0168441 A1 | 7/2009 | Lin |
| 2009/0189816 A1* | 7/2009 | Nikitin ............... H01Q 1/2208 343/702 |
| 2009/0192937 A1 | 7/2009 | Griffin et al. |
| 2009/0193500 A1 | 7/2009 | Griffin |
| 2009/0197551 A1 | 8/2009 | Paraskake |
| 2009/0212919 A1 | 8/2009 | Selgrath et al. |
| 2009/0221240 A1 | 9/2009 | Zhang |
| 2009/0257242 A1 | 10/2009 | Wendman |
| 2009/0258678 A1 | 10/2009 | Chava |
| 2009/0289776 A1 | 11/2009 | Moore et al. |
| 2009/0292816 A1 | 11/2009 | Etchegoyen |
| 2009/0297157 A1 | 12/2009 | Nakagawa |
| 2009/0303018 A1 | 12/2009 | Catteau |
| 2009/0309736 A1 | 12/2009 | Heurtier |
| 2009/0315670 A1 | 12/2009 | Naressi |
| 2010/0009627 A1 | 1/2010 | Huomo |
| 2010/0012715 A1 | 1/2010 | Williams et al. |
| 2010/0028587 A1 | 2/2010 | Grotefend |
| 2010/0046198 A1 | 2/2010 | Hoffman |
| 2010/0061048 A1 | 3/2010 | Mills |
| 2010/0066561 A1 | 3/2010 | Ulrich et al. |
| 2010/0075666 A1 | 3/2010 | Garner |
| 2010/0079416 A1 | 4/2010 | Chung et al. |
| 2010/0082444 A1 | 4/2010 | Lin et al. |
| 2010/0082485 A1 | 4/2010 | Lin et al. |
| 2010/0085774 A1 | 4/2010 | Park |
| 2010/0107463 A1 | 5/2010 | Spiro |
| 2010/0141452 A1* | 6/2010 | Lian et al. ............... 340/572.3 |
| 2010/0148964 A1 | 6/2010 | Broer |
| 2010/0148965 A1* | 6/2010 | Alexis et al. ............... 340/572.1 |
| 2010/0161410 A1 | 6/2010 | Tulloch |
| 2010/0161434 A1 | 6/2010 | Herwig et al. |
| 2010/0172149 A1 | 7/2010 | Siemiet |
| 2010/0174599 A1 | 7/2010 | Rosenblatt et al. |
| 2010/0188842 A1 | 7/2010 | Yohananoff |
| 2010/0089525 A1 | 8/2010 | Kronzer |
| 2010/0211431 A1 | 8/2010 | Lutnick et al. |
| 2010/0216396 A1 | 8/2010 | Fernandez et al. |
| 2010/0217709 A1 | 8/2010 | Aabye et al. |
| 2010/0231362 A1* | 9/2010 | Smith et al. ............... 340/10.42 |
| 2010/0255270 A1 | 10/2010 | Stuebiger |
| 2010/0255865 A1 | 10/2010 | Karmarkar |
| 2010/0262449 A1 | 10/2010 | Monteforte et al. |
| 2010/0269383 A1 | 10/2010 | Nifenecker |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau et al. |
| 2010/0306076 A1 | 12/2010 | Taveau |
| 2010/0306819 A1 | 12/2010 | Nahari et al. |
| 2010/0311326 A1 | 12/2010 | Klabunde et al. |
| 2011/0000971 A1 | 1/2011 | Onderko |
| 2011/0047759 A1 | 3/2011 | Reiter |
| 2011/0065383 A1 | 3/2011 | Frankland et al. |
| 2011/0084814 A1 | 4/2011 | Ramsch |
| 2011/0112918 A1 | 5/2011 | Mestre et al. |
| 2011/0112920 A1 | 5/2011 | Mestre et al. |
| 2011/0149596 A1 | 6/2011 | Lv et al. |
| 2011/0165859 A1 | 7/2011 | Wengrowitz |
| 2011/0191478 A1 | 8/2011 | Eischeid et al. |
| 2011/0195748 A1* | 8/2011 | Main et al. ............... 455/557 |
| 2011/0198024 A1 | 8/2011 | Lorence et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Lee |
| 2011/0235318 A1 | 9/2011 | Simon |
| 2011/0238995 A1 | 9/2011 | Blanco |
| 2011/0287718 A1 | 11/2011 | Abel |
| 2011/0289647 A1 | 12/2011 | Chiao et al. |
| 2011/0295108 A1 | 12/2011 | Cox et al. |
| 2011/0307309 A1 | 12/2011 | Forster et al. |
| 2011/0320291 A1 | 12/2011 | Coon |
| 2011/0320314 A1 | 12/2011 | Brown |
| 2011/0320345 A1 | 12/2011 | Taveau et al. |
| 2012/0001725 A1 | 1/2012 | Chen |
| 2012/0013448 A1 | 1/2012 | Baranowski |
| 2012/0024951 A1 | 2/2012 | Graeber |
| 2012/0032632 A1 | 2/2012 | Soar |
| 2012/0039472 A1 | 2/2012 | Liu et al. |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0083205 A1 | 4/2012 | Marcu et al. |
| 2012/0089845 A1 | 4/2012 | Raleigh |
| 2012/0154633 A1 | 6/2012 | Rodriguez |
| 2012/0156992 A1 | 6/2012 | Walker et al. |
| 2012/0265596 A1 | 10/2012 | Mazed et al. |
| 2012/0265682 A1 | 10/2012 | Menon |
| 2013/0006847 A1* | 1/2013 | Hammad et al. ............... 705/39 |
| 2013/0106576 A1 | 5/2013 | Hinman et al. |
| 2013/0173455 A1 | 7/2013 | Adams et al. |
| 2013/0309965 A1 | 11/2013 | Hillan |
| 2013/0342323 A1 | 12/2013 | Hinman et al. |
| 2013/0344805 A1 | 12/2013 | Lefley |
| 2014/0070850 A1 | 3/2014 | Darwhekar et al. |
| 2014/0113551 A1 | 4/2014 | Krishnan et al. |

FOREIGN PATENT DOCUMENTS

| | | |
|---|---|---|
| CN | 1341133 | 3/2002 |
| CN | 1503962 | 6/2004 |
| CN | 1741862 | 3/2006 |
| CN | 101253750 | 8/2008 |
| CN | 201302803 Y | 9/2009 |
| CN | 102217410 | 10/2011 |
| DE | 29721937 | 4/1999 |

(56) References Cited

FOREIGN PATENT DOCUMENTS

| | | |
|---|---|---|
| EP | 0751597 | 1/1997 |
| EP | 1127469 B1 | 7/2003 |
| EP | 1914631 | 4/2008 |
| EP | 2143991 | 1/2010 |
| EP | 1948995 | 4/2010 |
| EP | 1792272 B1 | 10/2010 |
| EP | 2237519 | 10/2010 |
| EP | 2296025 | 3/2011 |
| EP | 2309431 A1 | 4/2011 |
| EP | 2366937 | 9/2011 |
| EP | 2371110 | 10/2011 |
| FR | 2783960 | 3/2000 |
| GB | 2228916 | 9/1990 |
| GB | 2384479 | 7/2003 |
| JP | 2006011422 | 1/2006 |
| JP | 2006030882 | 2/2006 |
| JP | 2006058435 | 3/2006 |
| JP | 2006349887 | 12/2006 |
| JP | 2007034362 | 2/2007 |
| JP | 2002162918 | 6/2007 |
| KR | 20100072115 | 6/2010 |
| TW | M375255 | 3/2010 |
| WO | 8707697 | 12/1987 |
| WO | 90/00969 | 2/1991 |
| WO | 97/35290 | 9/1997 |
| WO | 00/43433 | 7/2000 |
| WO | 01/03641 | 1/2001 |
| WO | 2002084630 | 10/2002 |
| WO | 02/103108 | 12/2002 |
| WO | 2005015465 | 2/2005 |
| WO | 2006031824 | 3/2006 |
| WO | 2006095212 | 9/2006 |
| WO | 2006098765 | 9/2006 |
| WO | 2006111782 | 10/2006 |
| WO | 2007002459 | 1/2007 |
| WO | 2007035835 | 3/2007 |
| WO | 2007064069 | 6/2007 |
| WO | 2008034937 | 3/2008 |
| WO | 2008045541 | 4/2008 |
| WO | 2008063706 | 5/2008 |
| WO | 2008087431 | 7/2008 |
| WO | 2008132269 | 11/2008 |
| WO | 2008142455 | 11/2008 |
| WO | 2009011177 | 1/2009 |
| WO | 2009028203 | 3/2009 |
| WO | 2010077194 | 7/2010 |
| WO | 2010095988 | 8/2010 |
| WO | 2010148816 | 12/2010 |
| WO | 2011010970 | 1/2011 |
| WO | 2011020041 | 2/2011 |
| WO | 2011033424 | 3/2011 |
| WO | 2011053914 | 5/2011 |
| WO | 2011088190 | 7/2011 |
| WO | 2011094384 | 8/2011 |
| WO | 2011109092 | 9/2011 |
| WO | 2011112778 | 9/2011 |
| WO | 2011121488 | 10/2011 |
| WO | 2012037255 | 3/2012 |

OTHER PUBLICATIONS

"Bling: NFC Arrives in U.S.", Sam Churchill, Paypal (Oct. 27, 2010).
"Enabling RFID in Retail", G. Roussos, Birkbeck, University of London (Mar. 2006).
International Search Report and Written Opinion dated Aug. 1, 2011 for International Application No. PCT/US2011/034732 filed May 2, 2011.
International Preliminary Report on Patentability dated Feb. 2, 2009 for International Application No. PCT/US08/50804 filed Jan. 10, 2008.
International Search Report and Written Opinion dated May 16, 2008 for International Application No. PCT/US08/50804 filed Jan. 10, 2008.
Supplementary European Search Report dated Nov. 13, 2009 from corresponding European Application No. 08713717.0.
State Intellectual Property Office of PRC Notification of First Office Action dated Mar. 15, 2011 for Application No. 200880002063.3.
State Intellectual Property Office of PRC Notification of Second Office Action dated Apr. 1, 2012 for Application No. 200880002063.3.
State Intellectual Property Office of PRC Notification of Third Office Action dated Jan. 5, 2013 for Application No. 200880002063. 3.
State Intellectual Property Office of PRC Notification of Fourth Office Action dated Jul. 2, 2013 for Application No. 200880002063. 3.
Clothing Labels Expose'—BCI Corporation's Elegant Woven Label Selection Transforms Small Clothiers into Big Time Fashionistas, PRWeb, http://www.bcilabels.com, published Jun. 13, 2006.
International Search Report and Written Opinion dated Jan. 22, 2014 for International Application No. PCT/US13/066068 filed Oct. 22, 2013.
International Preliminary Report on Patentability dated Apr. 28, 2015 for International Application No. PCT/US13/066068 filed Oct. 22, 1013.
International Search Report and Written Opinion dated Jan. 25, 2012 for International Application No. PCT/US11/047312 filed Aug. 10, 2011.
EN Standard 343; 2003 from Proceedings for Nanotechnology and Smart Textiles for Industry, Lomax G.R., Sep. 2001.
J. Mater, Chem., 2007, 17, 2775-2784.
State Intellectual Property Office of PRC Notification of First Office Action and Search Report dated Mar. 20, 2014 for Application No. 201180045931.8.
State Intellectual Property Office of PRC Notification of Second Office Action dated Feb. 19, 2015 for Application No. 201180045931.8.
"AN1445: Antenna design guide for MFRC52x, PN51x and PN53x, Rev.1.2, Document AN1445_12", NXP B.V., (Oct. 11, 2010), 65 pgs.
"NFC Record Type Definition (RTD)", Technical Specification NFC Forum, RTD 1.0, NFCForum-TS-RTD_1 .0, (Jul. 24, 2006), 20 pgs.
"Radio Frequency Identification (RFID): A Focus on Information Security and Privacy", OECD Digital Economy Papers, No. 138, Jan. 14, 2008, 11-81.
"Radio-Frequency-IDentific@tion, http://rfid-handbook.com/", advertisement (Dec. 2, 2011), 5 pgs.
"South Korea Telecommunications Report Included BMI's Forecasts", Q2 2012, Business Monitor International Ltd., (Apr. 2012), 94 pgs.
A Near Field Communication Tool for Building Intelligent Environment using Smart Posters, International Journal of Computers and Communications, Issue 1, vol. 4, 2010, Pilar Castro Garrido, Guillermo Matas Miraz, Irene Luque Ruiz, and Miguel Angel Gomez-Nieto.
A Pervasive Presentator—Simplifying the Task of Presenting, Lulea University of Technology; Viktor Lindgren, Mattias Lundberg, Elias Naslund, John Viklund (2012).
A System of Secure Virtual Coupons Using NFC Technology, IEEE Computer Society, CompProceedings of the Fifth Annual IEEE International Conference on Pervasive Computing and Communications Workshops 2007 (PerComW'07); Manfred Aigner, Sandra Dominikus, Martin Feldhofer.
Amato-McCoy, Deena M. Crime stoppers: by focusing their loss prevention efforts on the entire enterprise, grocers are in a better position to combat internal and external theft. Grocery Headquarters, v77, n 11, p. 101 (3). Nov. 2011.
Anonymous, "Near-field communications will be standard technology for mobiles", Electronics Weekly, (Feb. 21, 2007), p. 8.
Antoniou, Zoe, "NFC-Based Mobile Middleware for Intuitive User Interaction With Security in Smart Homes", Proc. of the 5th IASTED International Conference on Communication Systems and Networks (CSN'06), Aug. 28-30, 2006, Palma De Mallorca, Spain, Track 543-038, 6pgs.

(56) References Cited

OTHER PUBLICATIONS

Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.
Bauer-Reich,C., et al. "Low-profile, high-permeability antennaless RFID tags for use on metal objects", Proceedings of the 2012 IEEE International Workshop on Antenna Technology (iWAT), (Mar. 5-7, 2012), 32-35.
Becher, Michael et al., "Mobile Security Catching Up? Revealing the Nuts and Bolts of the Security of Mobile Devices", 2011 IEEE Symposium on Security and Privacy, 96-11.
Bovelli, S., "A Novel Antenna Design for Passive RFID Transponders on Metal Surfaces", Proceedings of the 36th European Microwave Conference, Manchester, UK (Sep. 2006), 580-582.
Broil, Gregor, et al., "Touch to Play—Exploring Touch-Based Mobile Interaction with Public Displays", 3rd International Workshop on Near Field Communication, Feb. 22, 2011, 15-20.
Cavoukian, A., "Mobile Near Field Communications (NFC)—"Tap'n Go"—Keep it Secure & Private", Information and Privacy Commissioner, Ontario, Canada / Privacy by Design (Nov. 2011), 22 pgs.
Chai, Qi, "Design and Analysis of Security Schemes for Low-cost RFID Systems", Doctor of Philosophy Thesis in Electrical and Computer Engineering, University of Waterloo, Ontario, Canada, 2012, 184 pgs.
Cheng, Hsu-Chen, et al., "A Secure and Practical Key Management Mechanism for NFC Read-Write Mode", J. Computational Information Systems, 7:11, (2011), 3819-3828.
Cheng, Jerry, et al., "SmartSiren: Virus Detection and Alert for Smartphones", MobiSys'07, Jun. 11-14, 2007, San Juan, Puerto Rico, 258-271.
Choi, Kwanghoon, et al., "A Secure Application Invocation Mechanism in Mobile Phones for Near Field Communication", 2012 IEEE International Conference on Consumer Electronics (ICCE), Jan. 2012, 731-732.
Christian Metzger et al: "Making Radio Frequency Indentificalton Visible—A Watchdog Tag", Fifth Annual IEEE International Conference on pervasive computing and communications workshops, Mar. 19-23, 2007.
Christianson, B., et al. (eds.), "Security Protocols", 13th International Workshop, Revised Selected Papers, Cambridge, UK, (Apr. 20-22, 2005), Lecture Notes in Computer Science, 4631, Springer-Verlag, Berlin, 354 pgs.
Close Contact: An Examination of the Future of Near Field Communications, International Journal of Management & Information Systems—First Quarter 2012 vol. 16, No. 1; Chris Rose Capella.
Cole, P.H., et al., Networked RFID Systems and Lightweight Cryptography: Raising Barriers to Product Counterfeiting, First Edition, Springer-Verlag, Berlin (2003), 350 pgs.
Connecting the Mobile Phone with the Internet of Things—Benefits of EPC and NFC Compatibility; Thomas J.P. Wiechert, Florian Michahelles, 2007.
Coppolino, Luigi, et al., "A Trusted information Agent for Security Information and Event Management", ICONS 2012: The Seventh International Conference on Systems, 6-12.
Do you talk to each poster? Security and Privacy for Interactions with Web Service by means of Contact Free Tag Readings, Peter Schoo, Massimo Paolucci, Feb. 24, 2009 First International Workshop on Near Field Communication.
Dodson, B., et al., "Micro-Interactions with NEC-Enabled Mobile Phones", Proceedings of the Third International Conference on Mobile Computing, Applications, and Services (MobiCASE), Los Angeles, CA, Oct. 2011. Retrieved from the Internet: <URL: http://mobisocial.stanford.edu/papers/mobicase11.pdf>, 20 pgs.
Elliptic Curve Certificates and Signatures for NFC Signature Records, Reasearch in Motion, Certicom Research, Jan. 1, 2011, Tony Rosati, Greg Zaverucha.

Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Enhancing Authentication in eBanking with NFC enabled mobile phones, Aug. 11, 2008, Diego Alejandro Ortiz-Yepes.
Enhancing Security and Usability Features of NFC, 2009; Beygo, Omer Kerem; Eraslan, Cihan.
European Search Report dated Nov. 25, 2016 for European Application No. EP16002075 filed Sep. 26, 2016.
Finkenzeller, K., "Known attacks on RFID systems, possible countermeasures and upcoming standardization activities", presentation slides, RFID-Systech, Bremen, Germany, Jun. 2009. Retrieved from the Internet: <URL: http://rfidhandbook. de/downloads/Finkenzeller_Systech-Bremen-2009_v1.0.pdf>, 31 pgs.
Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35-49.
Francis, Lishoy, et al., "Practical Relay Attack on Contactless Transactions by Using NFC Mobile Phones", In Cryptology ePrint Archive, Report 2011/618, Nov. 2011, 16pgs.
Gebhart, M, et al., "Design of 13.56 MHz Smartcard Stickers with Ferrite for Payment and Authentication ", Proceedings of the 2011 3rd International Workshop on Near Field Communication (NFC), Feb. 21-22, 2011. Retrieved from the Internet: <URL: https://online.tugraz.at/tug_online/voe_main2.getVollText?pDocumentNr=202812&pCurrPk=59398>, 6 pgs.
Ghanname, Taoufik. How NFC can to speed Bluetooth transactions—today. Eetimes. Feb. 14, 2006. Retrieved at http://eetimes.com/General/PrintView/4012606.
Hancke, G.P., "Practical Eavesdropping and Skimming Attacks on High-Frequency RFID Tokens", Preprint version of article published in Journal of Computer Security. vol. 19, Issue 2. (Jun. 2010). Retrieved from the Internet: <URL: http://www.rfidblog.org.uk/Hancke-JoCSSpecialRFIDJune2010.pdf>, 23 pgs.
Hancke, G.P., "Security of proximity identification systems", Technical Report, No. 752, University of Cambridge Computer Laboratory, UK (Jul. 2009), 161 pgs.
Hancke, G.P., et al., "Security Challenges for User-Orented RFID Applications within the 'Internet of Things'", J. Internet Technology, vol. 11, No. 3, 2010, 307-313.
Hardy, Robert, et al., "Touch & Interact: Touch-based Interaction of Mobile Phones with Displays", MobileHCL 2008, Proc. 10th international conference on Human computer interaction with mobile devices and services, 245-254.
Haselsteiner, Ernst, et al., "Security in Near Field Communication (NFC): Strengths and Weaknesses", Proceedings of the Workshop on RFID Security (RFIDSec), Graz, Austria, Jul. 12-14, 2006, 11pgs.
Hend S. Al-Khalifa: "Utilizing QR Code and Mobile Phones for Blinds and Visually Impaired People", copyright 2008.
Hinske, S., et al., "RFIDice—Augmenting Tabletop Dice with RFID", Journal of Virtual Reality and Broadcasting, vol. 5, No. 4, (2008), 12 pgs.
Husni, Emir, et al., "Efficient Tag-to-Tag Near Field Communication (NFC) Protocol for Secure Mobile Payment", 2nd International Conference on Instrumentation, Communications, Information Technology, and Biomedical Engineering (ICICI-BME), Bandung, Indonesia, Nov. 8-9, 2011, 97-101.
International Preliminary Report on Patentability and Written Opinion dated Apr. 21, 2015 for International Application PCT/US13/031448 filed Mar. 14, 2013.
International Preliminary Report on Patentability and Written Opinion dated Jul. 31, 2012 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Preliminary Report on Patentability and Written Opinion dated Mar. 4, 2014 for International Application PCT/US12/053322 filed Aug. 31, 2012.
International Search Report dated Nov. 21, 2012 for International Application PCT/US12/053322 filed Aug. 31, 2012.

(56) References Cited

OTHER PUBLICATIONS

International Preliminary Report on Patentability and Written Opinion dated Mar. 10, 2015 for International Application PCT/US12/031136 filed Mar. 14, 2013.
International Preliminary Report on Patentability and Written Opinion dated May 19, 2015 for International Application PCT/US12/031131 filed Mar. 14, 2013.
International Search Report dated Aug. 20, 2013 for International Application PCT/US13/031131 filed Mar. 14, 2013.
International Search Report dated Aug. 6, 2013 for International Application PCT/US13/031448 filed Mar. 14, 2013.
International Search Report dated Mar. 11, 2011 for International Application PCT/US11/022687 filed Jan. 27, 2011.
International Search Report dated Mar. 8, 2011 for International Application PCT/US11/022680 filed Jan. 27, 2011.
International Search Report dated May 22, 2013 for International Application PCT/US12/031136 filed Mar. 14, 2013.
Johnansson, B., "An Introduction to RFID—Information Security and Privacy Concerns", TDDC03 Projects, (Spring 2004), 14 pgs.
Juels, A., et al., "The Blocker Tag: Selective Blocking of RFID Tags for Consumer Privacy", Proceedings of ACC CCS'03, Washington, DC (Oct. 27-30, 2003), 9 pgs.
Jung, M, et al., "All-Printed and Roll-to-Roll Printable 13.56-MHz-Operated 1-bit RF Tag on Plastic Foils", IEEE Transactions on Electron Devices, (Feb. 19, 2010), 10 pgs.
Kazmi, Hammad Raza, "Security and Privacy Issues in Near Field Communication (NFC) Systems",Master Thesis, Royal Institute of Technology, Sweden, Apr. 2011, 59 pgs.
Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.
Kortvedt, H.S., "Securing Near Field Communication ", Thesis for Master of Science in Communication Technology, Norwegian University of Science and Technology, (Jun. 2009), 135 pgs.
Kuo, S., "A performance evaluation method for EMI sheet of metal mountable HR RFID tag", Measurement, 44 (2011), 946-953.
Kupusamy, K. S. et al., "A Model for Remote Access and Protection of Smartphones Using Short Message Service", International]. Computer Science, Engineering and. Information Technology (IJCSEIT), vol. 2, No. 1, (Feb. 2012), 91-100.
LocaTag-An NFC-based system enhancing instant messaging tools with real-time user location; Kobler, Philip Koene, Helmut Kremar, Matthias Altmann, Jan Marco Leimeister, Apr. 20, 2010 Second International Workshop on Near Field Communication.
Location-Triggered Code Execution-Dismissing Displays and Keypads for Mobile Interaction; W. Narzt and H. Schmitzberger, C. Stephanidis (Ed.): Universal Access in HCI, Part II, HCII 2009, LNCS 5615, pp. 374-383, 2009. © Springer-Verlag Berlin Heidelberg 2009.
Long, Men, et al., "Human Perceivable Authentication: An Economical Solution for Security Associations in Short-Distance Wireless Networking", Proceedings of 16th International Conference on Computer Communications and Networks, Aug. 13-16, 2007, 257-264.
Madlmayr, Gerald, etal., "NFC Devices: Security & Privacy", Proceedings of the 3rd International Conference on Availability, Reliability and Security, Barcelona, Spain, Mar. 7, 2008, 13 pgs.
Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.
Mitrokotsa, A., et al., "Classification of RFID Attacks", Proceedings of the 2nd International Workshop on RFID Technology—Concepts, Applications, Challenges (IWRT 2008), in conjunction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.

Mobile Personal Devices meet Situated Public Displays: Synergies and Opportunities; Alan Dix, Corina Sas (2010). International Journal of Ubiquitous Computing (IJUC), 1(1), pp. 11-28. http://www.hcibook.com/alan/papers/MPD-SPD-2010/.
Mulliner, Collin, "Attacking NFC Mobile Phones", 25th Chaos Communication Congress, Berlin, Germany (Dec. 2008). Retrieved from the Internet: <URL: http://www.mulliner.org/nfc/feed/collin_mulliner_25c3_attacking_nfc_phones.pdf>, 71 pgs.
Mulliner, Collin, "Vulnerability Analysis and Attacks on NFC-enabled Mobile Phones", 2009 International Conference on Availability, Reliability and Security, Fukuoka, Japan,Mar. 16-19, 2009, 695-700.
Near Field Communication in Smartphones, Simon Burkard, Berlin Institute of Technology, Germany, 2012.
Near Field Communications Handbook, vol. 13 of Internet and Communications, 2009; Mohammad Ilyas.
Newport Digital Technologies to Implement Microsoft Licensing Agreement; Prepares to Launch First Ruggedized RFID Reader with Windows Mobile Operating System. Business Wire Oct. 20, 2009.
NFC and Mobile Payments Today, Andre Filipe de Axevedo Figueiredo Cruz, Nov. 2011.
NFC Data Exchange Format (NDEF), Technical Specification, NDEF 1.0, Jul. 24, 2006.
NFC Forum Type Tags, White Paper V1.0, Apr. 1, 2009—Public.
NFC Mobile Parlor Games Enabling Direct Player to Player Interaction, 2011 Third International Workshop on Near Field Communication, Avinash Nandwani, Paul Coulton, Reuben Edwards.
NEC-Based Mobile Interactions with Direct-View Displays; Khoovirajsingh Seewoonauth, Enrico Rukzio, Robert Hardy, and Paul Holleis, IFIP Conference on Human-Computer Interaction—INTERACT 2009 pp. 835-838.
NFC-CAP Securty Assessment, vol. 1.0—May 11, 2009; Diego A. Ortiz-Yepes.
Ongtang, Machiagar, et al. "Semantically Rich Application-Centric Security in Android", Security and Communication Networks, vol. 5, Issue 6, Jun. 2012, 658-673.
Opoku, Samuel King, "Performance Enhancement of Large-Size NFC Multi-Touch System", Cyber Journals: MultidisciplinaryJournals in Science and Technology, Journal of Selected Areas in Telecommunications (JSAT), (Oct. 2011), 52-57.
Oren, Y., "Attacks on RFID-Based Electronic Voting System", Cryptology ePrint Archive Report 2009/442 (2009). Retrieved from the Internet: <URL: http://eprint.iacr.org/2009/422.pdf>, 21 pgs.
Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen, Espoo May 2007. VTT Tiedotteita—Research Notes 2400.
Programming Android; Zigurd Mednieks, Laird Domin, G. Blake Meike, Masumi Nakamura, O'Reilly Media, Inc., 2011, http://books.google.co.in/books?id=5BGBswAQSIEC&lpg=PR5&ots=xSfgivFwS&dq=rogue%20NFC%20active%20tags%20url%20phone%20peer%20to%20peer&lr&pg=PA397#.
QR Code Tech Info: MECARD Format, May 2, 2011.
QRFactory, Redirectable QR, http://clashboard.qrfactory.com/, pulled from the Internet Apr. 27, 2012.
Rahnama, Behnam, et al., "Securing RFID-Based Authentication Systems Using ParseKey=", Proceedings of the 3rd International Conference on Security of Information and Networks,_Taganrog,_Russia,_Sept._7-11,_2010,_212-217.
RFID based applications in culture, media and creative industries, 2011 Third International Workshop on Near Field Communication, Eileen Kuehn, Jens Reinhardt, Stephan Bergemann, Prof. Dr. Juergen Sieck.
RFID Inventory Management System. Package Printing, v57 n2, pp. 34. Feb. 2010.
Rieback, M.R., et al., "A Platform for RFID Security and Privacy Administration", Proceedings of the 20th USENIX/SAGE Large Installation System Administration conference (LISA 2006), Washington D.C., (Dec. 2006). Retrieved from the Internet: <URL: http://www.rfidguardian.org/images/a/a9/Lisa.06.pdf>, 14 pgs.

(56) References Cited

OTHER PUBLICATIONS

Rieback, M.R., et al., "The Evolution of RFID Security", Pervasive Computing (Jan.-Mar. 2006), 62-69.
Roland, M., "Security Vulnerabilities of the NDEF Signature Record Type", Presentation from WIMA 2011—NFC Research Track, Monaco (Apr. 19, 2011). Retrieved from the Internet: <URL: http://www.wima.mc/dan/2011/CONF_PDF/TUESDAY/AM/ROLAND.pdf>, 14 pgs.
Roland, Michael, et al., "Digital Signature Records for the NFC Data Exchange Format", Second International Workshop on Near Field Communication, Monaco, Apr. 20, 2010, 71-76.
Sabzevar, A.P., "Security in RFID Systems" Project report for GMU ECE 646 (2004). Retrieved from the Internet: <URL: http://teal.gmu.edu/courses/ECE646/project/reports_2004/SP-4_report.pdf>, 13 pgs.
Sarma, S.E., et al., "RFID Systems and Security and Privacy Implications", CHES 2002, LNCS 2523, B.S. Kaliski Jr. et al. (Eds.) (2003), pp. 454-469, 2003.
Secure contactless mobile financial services with Near Field Communication; Adeola Oluwaseyi Poroye, Aug. 2011.
Simple NDEF Exchange Protocol, Technical Specification, NFC Forum SNEP 1.0, Aug. 31, 2011.
Situated Door Displays and how to interact with them, Barbara Schmid, Jan. 16, 2012.
Smart Poster Record Type Definition Technical Specific NFC Forum TM SPR 1.1 NFCForum-SmartPoster_RTD_1.0, Jul. 24, 2006.
Suh, J., "Introduction to composite electromagnetic noise absorber technology" EMC Directory & Design Guide, (2007), 4 pgs.
Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles.
Thamilarasu Get al: "Intrusion detection in RFID systems", Military Communications Conference, 2008, pp. 1-7.
The "Weak Spots" in Stacked UHF RFID Tags in NFC Applications, IEEE RFID 2010; Xiaosheng Chen, Feng Lu, Terry T.Ye.
The Junction Protocol for Ad Hoc Peer-to-Peer Mobile Applications; Computer Science Department Stanford University; Ben Dodson, Aemon Cannon, Te-Yuan Huang, Monica S. Lam, Apr. 2011.
The Mobile Phone as Digital SprayCan; Philip Garner, Omer Rashid, Paul Coulton, and Reuben Edwards, Proceedings of the 2006 ACM SIGCHI international conference on Advances in computer entertainment technology Article No. 12, Hollywood, California, USA—Jun. 14-16, 2006.
Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things, and Cyber, Physical and Social Computing.
Turcu, C. (ed.), Development and Implementation of RFID Technology, In-Teh, I-Tech Education and Publishing KG, Vienna, Austria (Feb. 2009), 564 pgs.
Type 1 Tag Operation Specification, Technical Specification, Technical Specification, NFC Forum T1TOP 1.1, Apr. 13, 2011.
Type 2 Tag Operation Specification Technical Specification, T2TOP 1.1 NFC Forum May 31, 2011.
Type 3 Tag Operation Specification, Technical Specification, Technical Specification, NFC Forum, T3TOP 1.1, Jun. 28, 2011.
Valkkynen, Pasi, et al., Suggestions for Visualizing Physical Hyperlinks, PERMID 2006: Pervasive Mobile Interaction Devices—Mobile Devices as Pervasive User Interlaces and Interaction Devices, Dublin, Ireland, May 7, 2006, 245-254.
Varshney, LR., et al.., "Securing Inductively-Coupled Communication", Information Theory and Applications Workshop (ITA) (Feb. 5-10, 2012), 6 pgs.
Vidano, R., "13.56-MHz Inductively Coupled Card Compatibility to Conducting Surfaces", Proceedings of Asia-Pacific Microwave Conference (2007), 4 pgs.
Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.
Wegleiter, H. et al., "Automatic Antenna Tuning Unit to Improve RFID System Performance", IEEE Transactions on Instrumentation and Measurement, vol. 60, No. 8,(Aug. 2011), 2797-2803.
Weis, Stephen A, "Security and Privacy Aspects of Low-Cost Radio Frequency Identification Systems", Security in Pervasive Computing 2003, LNCS 2802, D. Hutter et al. (Eds.) (2004) 201-212.
Yamada, I., et al., "Secure Active RFID Tag System", Ubicomp2005 Workshops, 5 pgs.
Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.

\* cited by examiner

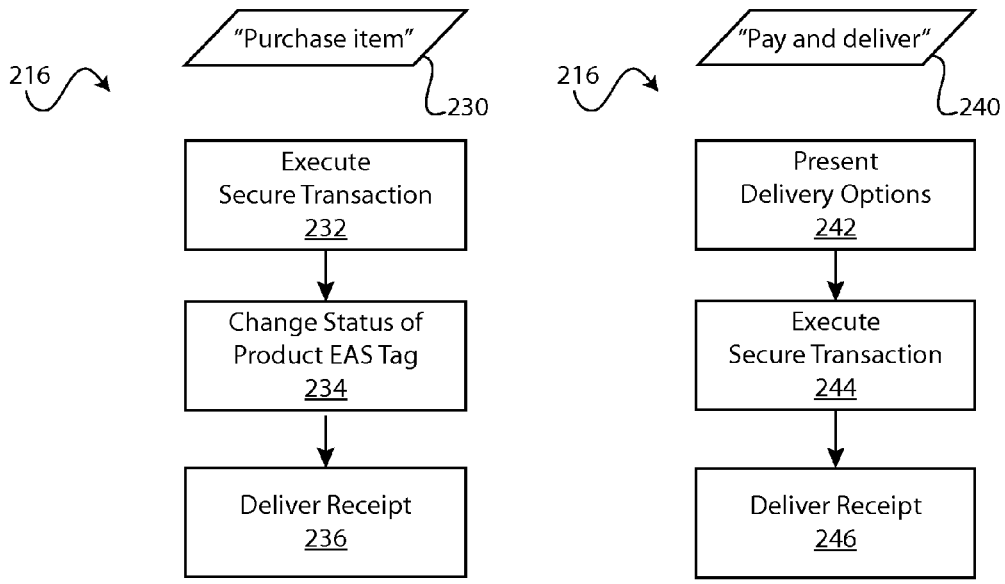
*Fig. 2b*   *Fig. 2c*
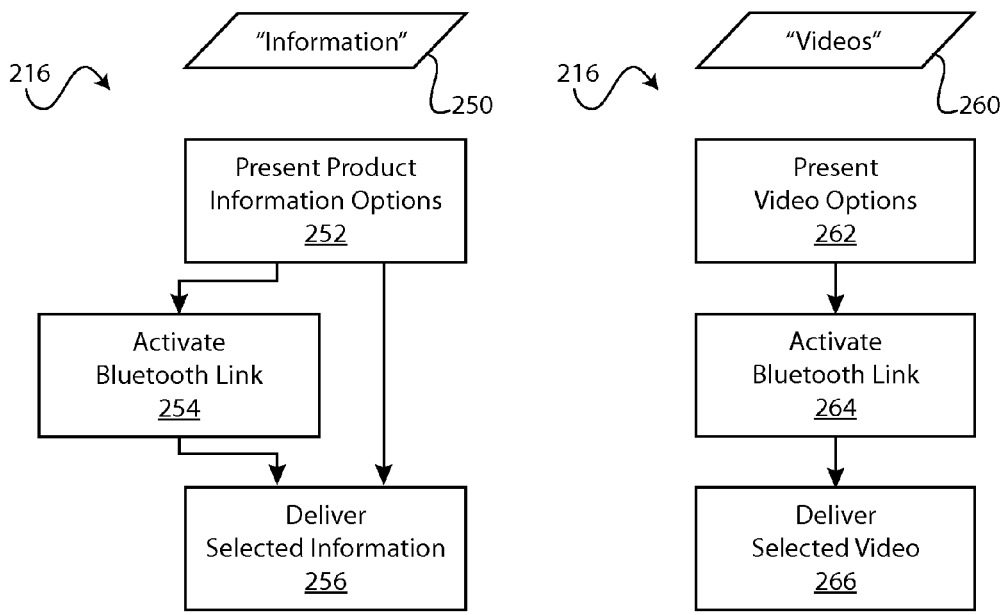
*Fig. 2d*   *Fig. 2e*

DISTRIBUTED POINT OF SALE, ELECTRONIC ARTICLE SURVEILLANCE, AND PRODUCT INFORMATION SYSTEM, APPARATUS AND METHOD

CROSS-REFERENCE TO RELATED APPLICATION(S)

The present application claims priority from U.S. Provisional application Ser. No. 13/287,269 filed Nov. 2, 2011, which is incorporated by herein by reference in its entirety.

BACKGROUND OF THE INVENTION

The use of radio frequency identification (RFID) tags to track, identify and locate goods has grown significantly in recent years. RFID tags allow manufacturers, distributors and retailers, amongst others, to regulate products and inventory, quickly determine production, manufacture, distribution or retail needs and efficiently intake and outtake items utilizing RFID tags. The RFID tags themselves can provide any desired product data and may be scanned or read in any of a variety of manners. One application of such devices is in electronic article surveillance (EAS) tags, which are commonly used to prevent unauthorized removal of inventory from a controlled area. The EAS tags may be paired with a detection system that is located at a boundary of the controlled area, and which generates an alert when an EAS tag is detected proximate to the detection system, unless the EAS tag is disabled. Typically, EAS tags are disabled at the point-of-sale, which in many establishments is a checkout counter that is visited after the customer has selected the items to be purchased and before exiting the establishment. The typical checkout counter format presents problems when faced with high customer volume and large quantities of products per customer, which result in long wait times and long customer queues at the checkout counter.

Near-field communication (NFC) is a type of radio frequency communication technology, operating at about 13.56 MHz and at bandwidth of about 2 MHz that allows for read-only and read-write communications between an NFC-enabled RF reader and an NFC-enabled tag. NFC operation is based on inductive coupling between two loop antennas, which allows for sharing of power and data between NFC-enabled devices. Typically, for proper operation, the distance between an NFC-enabled reader and an NFC-enabled tag typically needs to be under 20 centimeters.

NFC-enabled mobile devices can communicate with either host terminals or with tags or cards compliant with the 15014443 standard and resonating at 13.56 MHz. Communications between the NFC-enabled mobile device and an NFC-enabled terminal can include data transfer, initiation of a wireless connection under a different communications standard, secure payment, and other functions. The secure payment capabilities of NFC-enabled devices allow one to conveniently execute financial transactions using only the NFC-enabled mobile device.

While NFC allows for secure transactions and other capabilities, NFC tag read range is limited to a few centimeters. In contrast, typical RFID tag operating ranges can extend out to several meters, depending on tag configuration and reader power. Additionally, RFID tags have a lower cost than NFC-enabled tags. These factors make RFID tags better suited for the retail environment, where functions such as inventory management, retail display monitoring, and the like require large quantities of RFID tags and greater read ranges.

A solution for integrating NFC-enabled devices, RFID-based inventory management, EAS control, and streamlined point-of-sale experiences is therefore desired.

SUMMARY OF THE INVENTION

According to at least one exemplary embodiment, a distributed point of sale, electronic article surveillance, and product information system is disclosed. The system can include a central database and at least one integrated POS/EAS/information terminal adapted to communicate with NFC-enabled devices, RFID and EAS tags, and the database, wherein, when a customer places an NFC-enabled device and a product having an RFID and EAS tag and proximate the terminal, the terminal facilitates a transaction for purchasing the product. The terminal can include a processor, an NFC transceiver, a UHF RFID reader, and a Bluetooth transceiver. The transaction for purchasing the product can be performed via the NFC-enabled device. The terminal can further provide the customer with information pertaining to the product, and the information can be displayed on the NFC-enabled device.

According to another exemplary embodiment, a method for facilitating transactions using a distributed point of sale, electronic article surveillance, and product information system, is disclosed. The method can include placing an NFC-enabled device and a product having an RFID and EAS tag in proximity to an integrated POS/EAS/information terminal, initiating an NFC link between the NFC-enabled device and the terminal, interrogating the RFID and EAS tag by the terminal, receiving information pertaining to the product from a database, presenting the customer with a list of options regarding the product, executing a selected option from the list of options and terminating the NFC link.

According to another exemplary embodiment, a terminal for a distributed point of sale, electronic article surveillance, and product information system. The terminal can include a processor, an NFC transponder, a UHF RFID reader, a Bluetooth transponder, and an 802.11-compliant antenna, wherein, upon receiving an NFC signal from an NFC-compliant device, the terminal establishes an NFC link with the NFC-compliant device, interrogates an RFID and EAS tag located proximate to the terminal, and facilitates a secure transaction for purchase of a product on which the RFID and EAS tag is disposed.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIGS. 2b-2g show exemplary methods for executing user selections by a distributed point of sale, electronic article surveillance, and product information system.

DETAILED DESCRIPTION OF THE EMBODIMENTS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
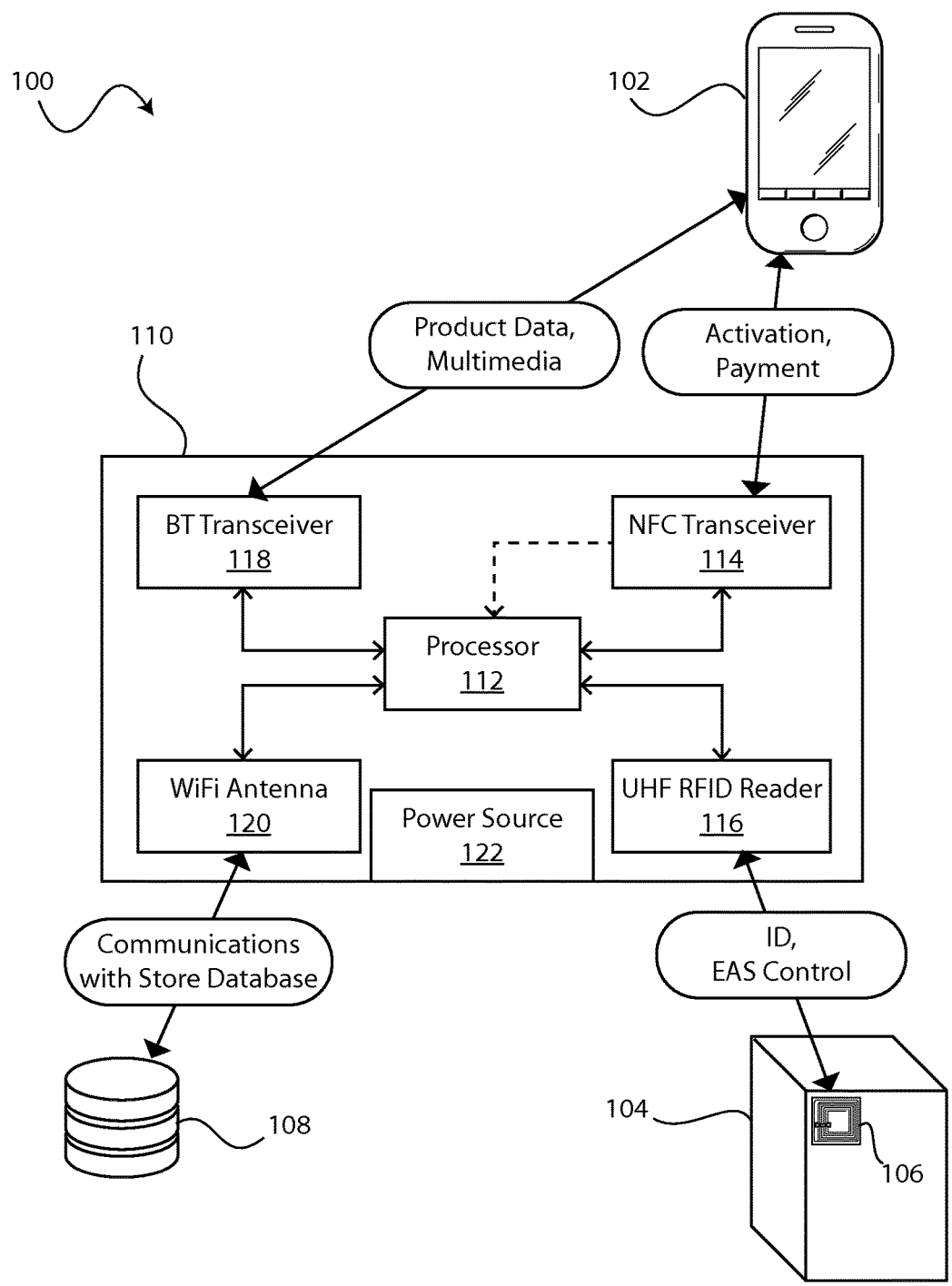
FIG. 1 shows an exemplary diagram of a distributed point of sale, electronic article surveillance, and product information system.

According to at least one exemplary embodiment, and as shown in FIG. 1, a distributed point of sale, electronic article surveillance, and product information system 100 may be disclosed. System 100 can include at least one integrated POS/EAS/information terminal 110, which may be referred to as a "pay spot." System 100 may be adapted to communicate with an NFC-enabled device 102 via pay spot 110. NFC-enabled device 102 may be, for example, a mobile communications device and may include software or logic configured to operate with system 100. Pay spot 110 may further be adapted to communicate with device 102 using Bluetooth, or any other desired short range communication protocol, if device 102 is so equipped. System 100 may further include a central database 108, or may be adapted to communicate with an existing store database for a particular retail location. Communications with database 108 may be performed via pay spot 110 and may utilize 802.11-compliant routers or repeaters that are present in the retail location.

Pay spot 110 can further be adapted to communicate with RFID tags 106. RFID tags 106 may be disposed on products 104, and may include both product identification and EAS capabilities. Thus, communications between pay spot 110 and RFID tags 106 may include product identification communications as well as communications for EAS purposes. In some embodiments, RFID tags 106 may include a secondary antenna tuned to the 13.56 MHz frequency.

Each pay spot 110 can include a processor 112, an NFC transceiver 114, an UHF RFID reader 116, a Bluetooth transceiver 118, and an 802.11-compliant Wi-Fi antenna 120. Processor 112 may be communicatively coupled to each of components 112, 114, 116 and 118. A power source 122 may further be provided, which may be any internal or external, AC or DC power source that enables system 100 to function as described herein. Additionally, a pay spot 110 can include other components, for example, but not limited to, activity indicators such as LEDs, displays that may be LCD, LED, or OLED based and that may be touch-sensitive, audio emitting components, user-operable controls, and so forth.

Each pay spot 110 can have an enclosure containing at least the above-described components. The configuration, shape, and ornamental features of the enclosure, as well as any indicia disposed thereon may be adapted for each retail location where system 100 is being used. For example, the enclosure may be configured so as to conform to the trade dress of a particular retail establishment, shopping center, airport terminal, or other location where system 100 is being used.

A plurality of pay spots 110 may be provided at a retail location such that customers shopping at the location can easily locate and interact with a pay spot and such that customers experience minimal or no queuing time. To interact with a pay spot 110, a customer would need to use an NFC-enabled device 102, such as a mobile communications device.

Figure 2A:
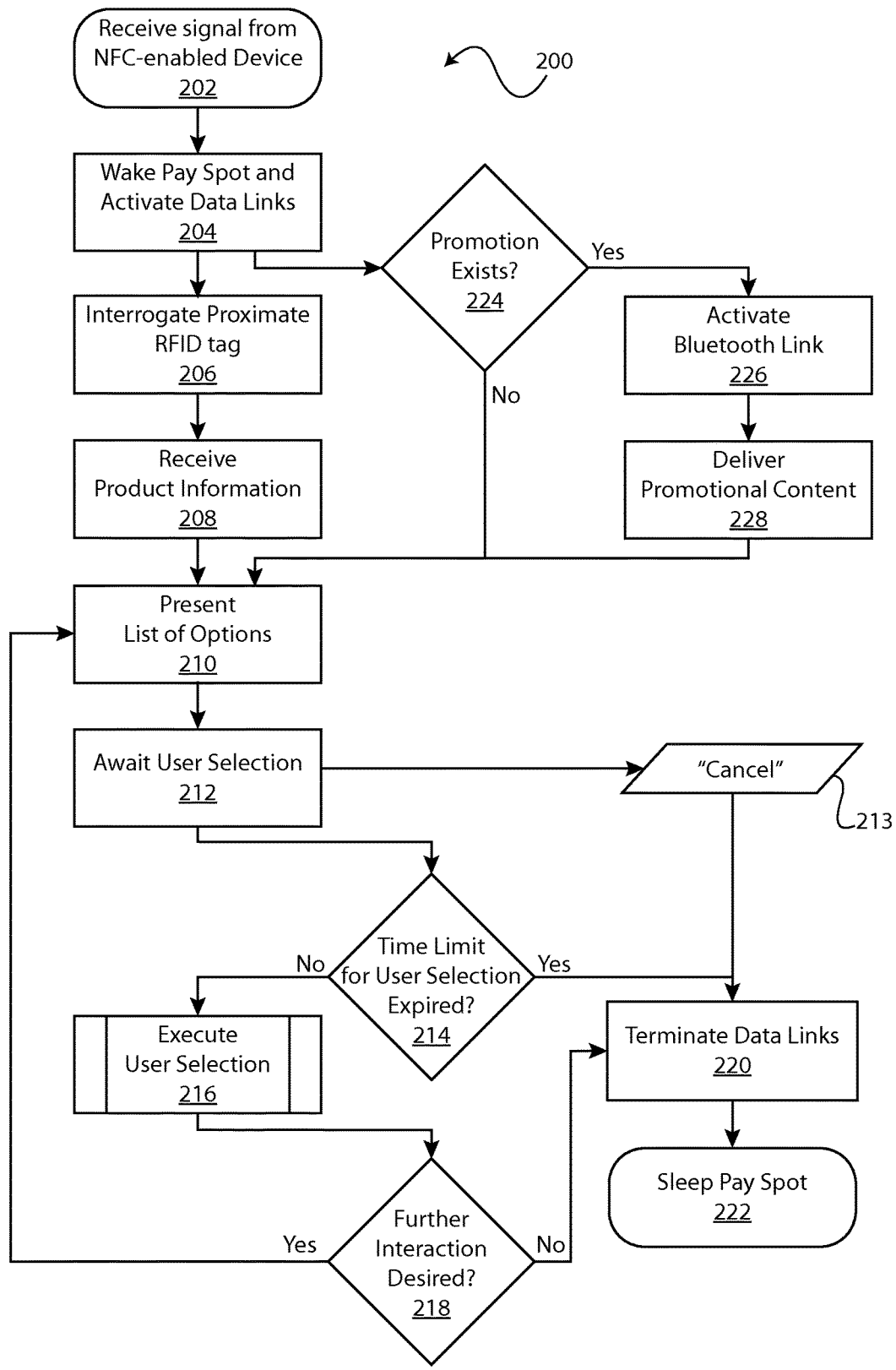
FIG. 2a shows an exemplary method for facilitating transactions using a distributed point of sale, electronic article surveillance, and product information system.

FIG. 2a illustrates an exemplary method for facilitating transactions 200 using a distributed point of sale, electronic article surveillance, and product information system. Initially, a pay spot 110 may be in a low-power "sleep" mode. At step 202, a customer may simultaneously place an NFC-enabled device 102 and a product 104 having RFID tag 106 in proximity with pay spot 110 such that both device 102 and product 104 are within the NFC field area of the pay spot. The signal from NFC-enabled device 102 can be received by NFC transceiver 114 of pay spot 110. Consequently, at step 204, the signal received by the NFC transceiver can induce processor 112 to exit the sleep mode and to activate data links between NFC transceiver 114 and mobile device 102, between RFID reader 116 and RFID tag 106, and between pay spot 110 and database 108. Communications between Bluetooth transceiver 118 and mobile device 102 may also be activated if desired.

At step 206, pay spot 110 may interrogate the RFID tag 106 of the product 104 that is in proximity to the pay spot. If RFID tag 106 includes a secondary antenna tuned to the 13.56 MHz frequency, the UHF response of the RFID tag can be modulated by the NFC transmissions between pay spot 110 and device 102. As the field area of the NFC transmissions is typically under 20 centimeters, only signals from RFID tags that are in proximity to the pay spot so as to be within the NFC field area would be thusly modulated. One or both of processor 112 and RFID reader 116 can therefore be adapted to prioritize UHF signals that are modulated by the NFC transmission, thereby reducing the likelihood of cross-reads between RFID reader 116 and other RFID tags that are located in the general vicinity of pay spot 110.

At step 208, pay spot 110 can receive identifying information about product 104 as a consequence of interrogating RFID tag 106. Once the product is identified, additional information about the product may be received from database 108. Subsequently, at step 210, the pay spot can present the customer with a list of options. The list of options may be communicated to the customer's NFC-enabled device 102 via the NFC link, and may be presented on the screen of the device. An exemplary list of options can include options to obtain information, specifications and videos about product 104, options to locate a desired size, color, or other feature of product 104, options to purchase product 104 directly or by delivery, options to cancel the transaction, and so forth. Other options to be included in the list of options may be contemplated and provided as desired, and may be customized by and for the particular retail location at which system 100 is being used.

At step 212, pay spot 110 may await the user selection. If a "cancel" request 213 is returned, pay spot 110 can proceed to step 220, whereby any active data links between pay spot 110, device 102, and database 108 are terminated. Subsequently, at step 222, pay spot can re-enter the low-power sleep mode.

If a cancel request is not received, at step 214 the pay spot can determine if a preset time limit for receiving the user selection has expired. If so, pay spot 110 can proceed to the termination and sleep procedures of steps 220 and 222.

If a cancel request is not received, and user selection is received within the time limit, pay spot 110 can execute the user selection at step 216, exemplary methods for which are described further below. Subsequent to the execution of the user selection, pay spot can prompt the user, at step 218, if further interaction is desired. If so, pay spot 110 may return to step 210, wherein the list of options of can again be presented to the user. If no further interaction is desired, pay spot 110 can proceed to the termination and sleep procedures of steps 220 and 220.

In some embodiments, promotional material may be provided to the customer during the transaction process 200. Subsequent to step 204, wherein the pay spot activates desired data links, pay spot 110 can query database 108 at step 224 to determine whether any promotional material is available to be offered to the customer. If such material is available, pay spot 110 can activate the Bluetooth link to device 102 at step 226. At step 228, promotional content, such as videos, images, text offers, coupons, and so forth may then be sent via the Bluetooth link to device 102 and displayed on the screen of the device. The promotional content delivery steps 224, 226, and 228 may be performed simultaneously with steps 206 and 208, wherein the pay spot is interrogating RFID tag 106 of product 104 and retrieving information about the product.

FIG. 2b illustrates an exemplary method for executing the user selection at step 216, wherein the user selection is "purchase item" 230. Upon the user selecting "purchase item," pay spot 110 can initiate a secure transaction at step 232 via the NFC link with NFC-enabled device 102. All steps and user interactions necessary for the secure transaction may be performed on device 102 and via the communications network of device 102. Once the secure transaction is completed, at step 234, pay spot 110 can change the status of the EAS tag 106 via RFID reader 116. For example, the EAS tag 106 of product 104 may be deactivated, or may have its status set to "paid," thereby enabling the customer to remove the product from the EAS-controlled area of the retail location. Subsequently, at step 236, a purchase receipt may be delivered to the customer, via device 102, or via a known email address that is associated with the customer.

FIG. 2c illustrates an exemplary method for executing the user selection at step 216, wherein the user selection is "pay and deliver" 240. Upon the user selecting "pay and deliver," pay spot 110 can present the user, at step 242, with any available options for delivery of product 104, the corresponding delivery prices, and the address to which the item is to be delivered. The address for delivery may be a preselected default address that is automatically chosen, or the customer may be prompted to enter a delivery address or select a delivery address from a list of pre-entered addresses. The delivery options may be communicated to the customer's NFC-enabled device 102 via the NFC link, and may be presented on the screen of the device. Once the user has selected desired delivery options, pay spot 110 can initiate a secure transaction, at step 244, via the NFC link with NFC-enabled device 102. All steps and user interactions necessary for the secure transaction may be performed on device 102 and via the communications network of device 102. Subsequently, at step 246, a purchase receipt may be delivered to the customer, via device 102, or via a known email address that is associated with the customer. The "pay and deliver" method can allow the customer to conveniently request delivery of a desired product, for example, in the case of a heavy or bulky product, or in the case where the customer is purchasing a product for someone else, or if the customer simply does not desire to carry or transport the products.

FIG. 2d illustrates an exemplary method for executing the user selection at step 216, wherein the user selection is "information" 250. Upon the user selecting "information," pay spot 110 can present the user, at step 252, with a list of information options pertaining to product 104. The information options may be communicated to the customer's NFC-enabled device 102 via the NFC link, and may be presented on the screen of the device. The product information options can include product specifications, images of the product, instruction manuals, product reviews, and any other desired information. If the selected information option requires that a substantially large data file be transmitted to device 102, pay spot 110 can activate a Bluetooth link to device 102 at step 254, and can transmit the requested data to the device 102 via Bluetooth at step 256. The requested data may be sourced, for example, from database 108. Alternatively, if the selected information option is a data file having a substantially small size, pay spot 110 can proceed directly to step 256 and transmit the requested data via the NFC link.

FIG. 2e illustrates an exemplary method for executing the user selection at step 216, wherein the user selection is "videos" 260. Upon the user selecting "information," pay spot 110 can present the user, at step 262, with a list of video options pertaining to product 104. The video options may be communicated to the customer's NFC-enabled device 102 via the NFC link, and may be presented on the screen of the device. Once the customer selects a video option, pay spot 110 can activate a Bluetooth link to device 102 at step 264, and can transmit the requested video to the device 102 via Bluetooth at step 266. The requested video may be sourced, for example, from database 108.

Figure 2F:
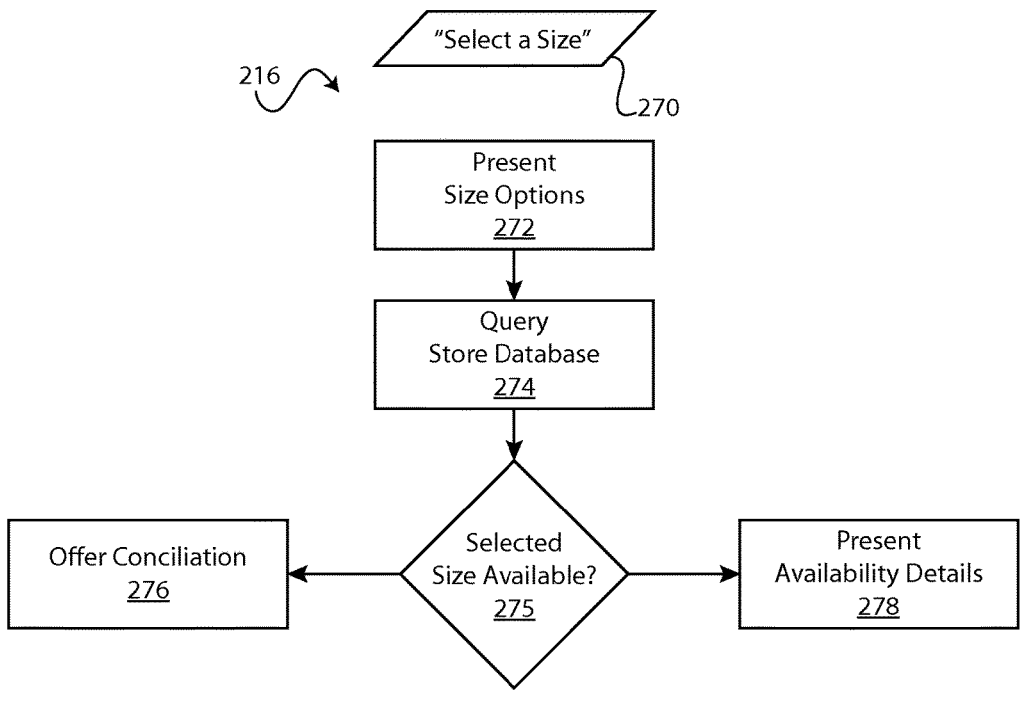

FIG. 2f illustrates an exemplary method for executing the user selection at step 216, wherein the user selection is "find a size" 270. Upon the user selecting "find a size," pay spot 110 can present the user, at step 272, with a list of size options pertaining to product 104. The size options may be communicated to the customer's NFC-enabled device 102 via the NFC link, and may be presented on the screen of the device. Once the customer selects a size option, pay spot 110 can query database 108 at step 274. At step 275, pay spot 110 can use the query results to determine whether product 104 in the desired size is present in the inventory of the retail location. If the desired product is present, pay spot 110 can present further details about the matching products to the customer at step 278, including the option to purchase. If the desired product is not in inventory, pay spot 110 can present a conciliation offer to the customer at step 276. Such conciliation offers can include free delivery of the product, discounts and coupons, gift cards, or any other desired offer that may be contemplated. The conciliation offers can be customized by and for the particular retail location at which system 100 is being used.

Figure 2G:
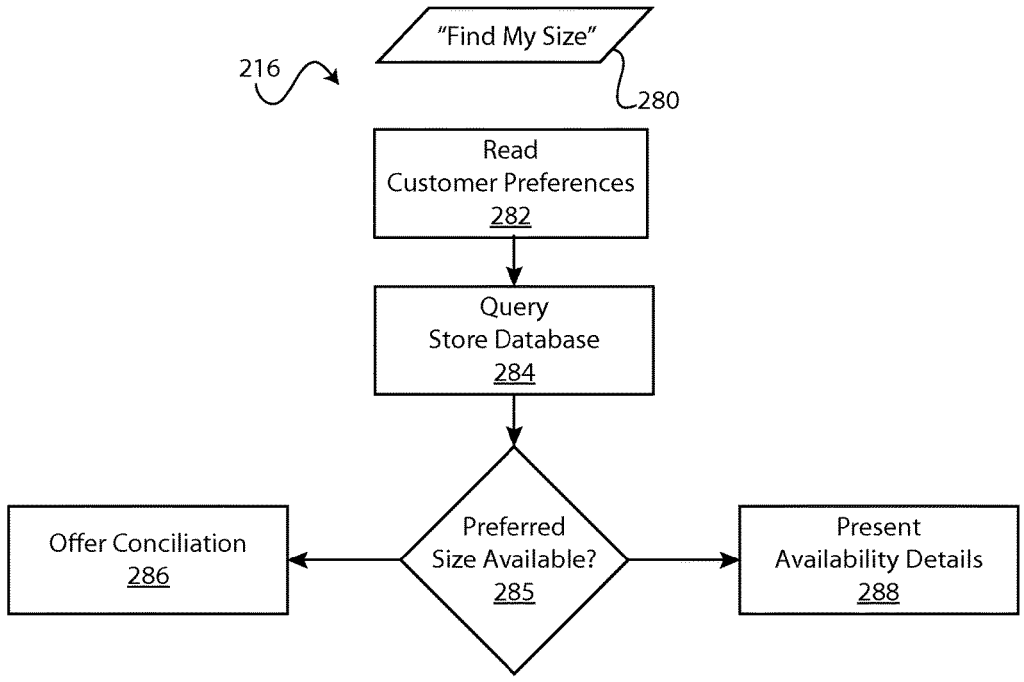

FIG. 2g illustrates an exemplary method for executing the user selection at step 216, wherein the user selection is "find my size" 280. For method 280, the customer may have pre-entered desired customer preferences into NFC-enabled device 102. These preferences can include any preferred characteristic for any product or can be a pre-defined set of characteristics, such as preferred sizes, colors, features, and so forth. The customer preferences may then be cross referenced with a product 104 so as to present the customer with variations of a product 104 that conform to the customer's preferences.

Upon the user selecting "find my size," pay spot 110 can obtain customer preferences from NFC-enabled device 102, at step 282. The color options may be communicated to the customer's NFC-enabled device 102 via the NFC link, and may be presented on the screen of the device. If the customer preferences do not match the characteristics of the scanned product 104, pay spot 110 can query database 108 at step 284. At step 285, pay spot 110 can use the query results to determine whether there are any products present in the inventory of the retail location that conform to the user preferences. If the desired product is present, pay spot 110 can present further details about matching products to the customer at step 288, including the option to purchase. If the desired product is not in inventory, pay spot 110 can present a conciliation offer to the customer at step 286. Such conciliation offers can include free delivery of the product, discounts and coupons, gift cards, or any other desired offer that may be contemplated. The conciliation offers can be customized by and for the particular retail location at which system 100 is being used.

The exemplary methods of steps 216 for user selections 270 and 280 may be adapted for any desired characteristic of a particular product, and can vary based on the type of product that is being interrogated. Options for selecting a particular characteristic of a product can be customized by and for the particular retail location at which system 100 is being used.

The embodiments of the systems and methods disclosed herein can thus provide a simple, secure and convenient way for customers to purchase products through secure transactions conducted via terminals distributed in a retail location. The availability of multiple distributed terminals facilitates reducing queuing and wait times for purchasing products and can reduce the amount of personnel necessary for point-of-sale and electronic article surveillance operations. The terminals can allow customers to have a multimedia experience by providing information regarding the products, and can further allow customers to have the products delivered to a location of their choice. Thus, the systems and methods disclosed herein may be used in locations with limited floor space, where a limited local inventory may be maintained for demonstration purposes, while purchased products can be delivered from a remote storage location. Furthermore, these systems and methods may be combined with subscription delivery plans, where a customer may opt to receive free or discounted rapid delivery in exchange for a periodic fee. Thus, the systems and methods disclosed herein can result in substantial cost savings to retail operators as well as increased convenience for customers.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A distributed point of sale, electronic article surveillance, and product information system, comprising:
   a central database; and
   at least one integrated POS/EAS/information terminal comprising a processor, a NFC transceiver, a UHF RFID reader, and a Bluetooth transceiver,
   wherein the integrated POS/EAS/information terminal is:
      adapted to communicate with NFC enabled devices, RFID and EAS tags, and the central database, where a RFID and EAS tag may be deactivated, or may change status, to permit removal of the product from an EAS-controlled area of a retail location without an alarm; and
      configured such that when a customer places an NFC-enabled device and a product having an RFID and EAS tag that comprises a secondary antenna, within the field area of NFC transmissions between the NFC-enabled device and the integrated POS/EAS/information terminal, the integrated POS/EAS/information terminal facilitates a transaction for purchasing the product, wherein the integrated POS/EAS/information terminal is adapted to prioritize receiving modulated UHF signals from RFID tags, the modulated UHF signals being modulated by an NFC transmission.

2. The system of claim 1, wherein the processor is communicatively coupled to the NFC transceiver, the reader and the Bluetooth transceiver.

3. The system of claim 1, wherein the terminal includes an enclosure containing the processor, the NFC transceiver the reader and the Bluetooth transceiver.

4. The system of claim 1, wherein the transaction for purchasing the product is performed via the NFC-enabled device.

5. The system of claim 1, wherein the terminal provides the customer with information pertaining to the product.

6. The system of claim 5, wherein the information is displayed on the NFC-enabled device.

7. The system of claim 1, wherein the second antenna is tuned to 13.56 MHz.

8. The system of claim 1, wherein the system further includes a power source.

9. The system of claim 1, wherein the at least one terminal includes LEDS and/or displays that are LC, LED or OLED based.

10. A terminal for a distributed point of sale, electronic article surveillance, and product information system, comprising:
   a processor;
   an NFC transponder;

a UHF RFID reader;
a Bluetooth transponder; and
an 802.11-compliant antenna;
wherein, upon receiving an NFC signal from an NFC-compliant device, the terminal:
establishes an NFC link with the NFC-compliant device;
interrogates an RFID and EAS tag having a secondary antenna when a product having the RFID and EAS is placed within a field area of NFC transmissions between the NFC-compliant device and the terminal, wherein the terminal is adapted to prioritize receiving modulated UHF signals from RFID tags, the modulated UHF signals being modulated by an NFC transmission;
facilitates a secure transaction for purchase of a product having the RFID and EAS tag;
deactivates or changes the status of the RFID and EAS tag to permit removal of the product from an EAS-controlled area without an alarm.

11. The terminal of claim 10, wherein the terminal transmits information to the NFC-enabled device, the information pertaining to the product on which the RFID and EAS tag is disposed.

12. The terminal of claim 10, wherein the secondary antenna is tuned to 13.56 MHz.

13. The terminal of claim 10, wherein the processor, the NFC transponder, the UHF RFID reader, the Bluetooth transponder, and the 802.11-compliant antenna are contained within an enclosure.

14. The terminal of claim 13, wherein the enclosure conforms to a trade dress of a particular location.

15. The terminal of claim 10, wherein the terminal is initially in a low-power "sleep mode" but exits the low-power, "sleep mode" when the NFC transponder receives a signal and induces the processor to exit the "sleep mode".

16. The terminal of claim 10, wherein the terminal provides the customer with information pertaining to the product.

17. The terminal of claim 10, wherein the terminal presents a customer on a customer's NFC enabled device with a list of options that include to obtain information, specification and videos about a product, options to locate a desired size, color or other feature of product, options to purchase product directly or by delivery, and/or options to cancel the transaction.

* * * * *